Aug. 16, 1966 S. A. PAOLI 3,266,542
MACHINE FOR SEPARATING FRAGMENTS OF BONE, GRISTLE OR SINEW
FROM COMMINUTED MEAT
Filed Sept. 2, 1964 6 Sheets-Sheet 2

INVENTOR.
STEPHEN A. PAOLI
BY
Wolfe, Hubbard, Voit + Osann
ATTYS.

Aug. 16, 1966   S. A. PAOLI   3,266,542
MACHINE FOR SEPARATING FRAGMENTS OF BONE, GRISTLE OR SINEW
FROM COMMINUTED MEAT
Filed Sept. 2, 1964   6 Sheets-Sheet 3

INVENTOR.
STEPHEN A. PAOLI
BY
Wolfe, Hubbard, Voit & Osann
ATTYS.

INVENTOR.
STEPHEN A. PAOLI

INVENTOR.
STEPHEN A. PAOLI
BY
Wolfe, Hubbard, Voit & Osann
ATTYS.

Aug. 16, 1966 S. A. PAOLI 3,266,542
MACHINE FOR SEPARATING FRAGMENTS OF BONE, GRISTLE OR SINEW
FROM COMMINUTED MEAT
Filed Sept. 2, 1964 6 Sheets-Sheet 6
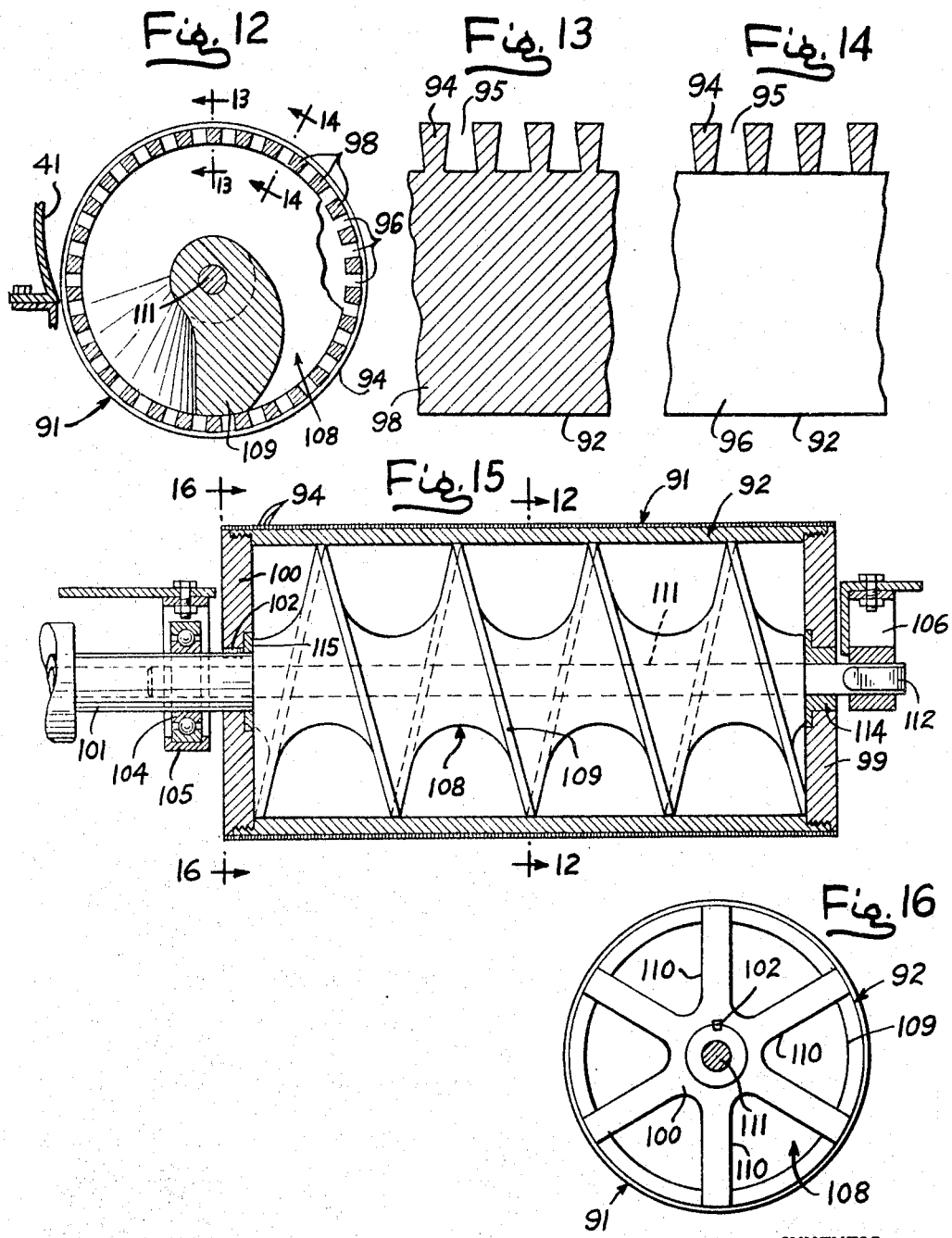
INVENTOR.
STEPHEN A. PAOLI
BY
Wolfe, Hubbard, Voit & Osann
ATTYS.

United States Patent Office 3,266,542
Patented August 16, 1966

3,266,542
MACHINE FOR SEPARATING FRAGMENTS OF BONE, GRISTLE OR SINEW FROM COMMINUTED MEAT
Stephen A. Paoli, 821 Westchester Drive, Rockford, Ill.
Filed Sept. 2, 1964, Ser. No. 393,966
12 Claims. (Cl. 146—76)

The present invention relates in general to food processing machinery and, more specifically, to a machine for recovering usable meat from a mixture of comminuted meat and fragments of bone, gristle, sinew or the like. This application is a continuation-in-part of my copending application Serial No. 311,555, filed September 25, 1963, as a continuation-in-part of my earlier filed application Serial No. 27,140, filed May 5, 1960, both now abandoned.

In modern food processing, huge quantities of comminuted raw meat from poultry, other livestock or fish are utilized in the manufacture of food products such as bologna, wieners, pot pies, spreads, soups, sauces, sticks, baby foods and countless others. The desirability of automating the production of such comminuted meat has long been recognized but little progress has been made in that direction heretofore because of the high manual labor factor required in removing the meat from the bones. This has resulted in increased costs to the consumers of processed foods. It has also resulted in lower returns to food producers due to the downgrading of certain meat and poultry items where the cost of manually removing meat from bone is not economically justified. These downgraded items, such as chicken and turkey necks and backs, or manually cleaned beef and pork bones, are frequently ground up and used in relatively low priced products such as dog food even though they contain some high quality lean meat. Separation of such meat from the mixture of meat and fragments of bone, cartilage, gristle, sinew and the like discharged by the grinder has not been feasible heretofore.

Another aspect of the problem of removing or separating from bone occurs in meat packing operations after the carcass has been divided into prime cuts and the usable meat cut away from the bones. The latter are subsequently scraped to recover as much of the remaining usable meat as possible. As an incident to such processing, the saws, cleavers, knives and other equipment used to tend to produce fragments of bone, gristle, sinew or the like that become entrained in the meat. This is particularly true of ground or otherwise comminuted meat. While such entrained fragments are harmless from the nutritional standpoint, they tend to detract from the value and salability of the meat product. Heretofore there has been no practical way to remove such fragments without introducing water, cooking the meat, or otherwise changing its character drastically.

The general aim of the present invention is to provide a machine for separating fragments of bone, gristle, sinew and the like from comminuted meat without damaging the meat in any way, thereby making possible fully automated production of comminuted meat from poultry, other livestock, or fish.

A more specific object of the invention is to provide a machine of the type set forth above and adapted to produce, without introducing any additives, a high yield of high quality meat product free from objectionable fragments of bone, gristle or sinew.

Another object is to provide a machine of the character set forth and capable of operating automatically and continuously at high production rates without clogging.

A further object is to provide a machine of the foregoing type which will be of economical construction yet sufficiently rugged to stand the rigorous duty normally prevailing in a poultry processing or meat packing plant.

Still another object is to provide a machine of the character set forth which will be of relatively simple construction, easily disassembled for cleaning and maintenance, and which will meet in all respects the high standards of sanitation normally required for meat processing equipment.

Other objects and advantages will become apparent as the following description proceeds, taken together with the accompanying drawings, wherein:

FIGS. 4 and 5 are, respectively, side and end elevational views of the illustrative machine shown in FIG. 1.

Figure 7:
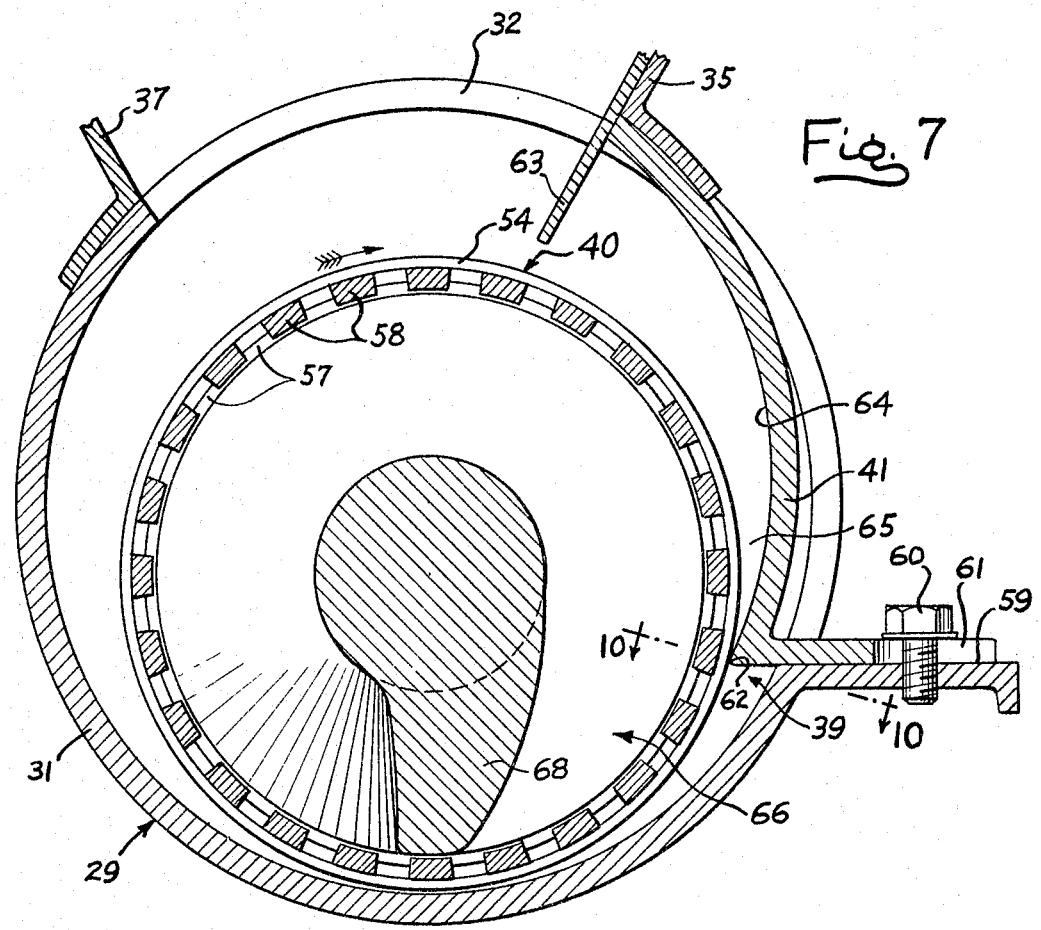
Figure 8:
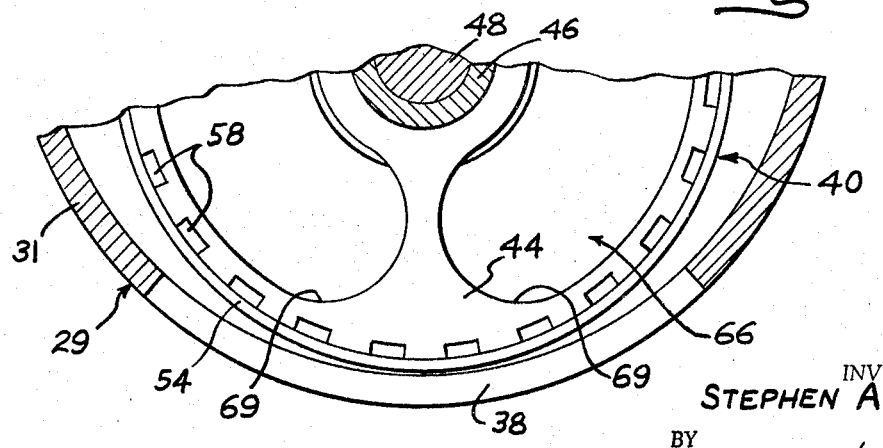

FIGS. 7 and 8 are enlarged fragmentary vertical sectional views taken transversely through the machine in the planes of the lines 7—7 and 8—8, of FIG. 4, respectively.

Figure 9:
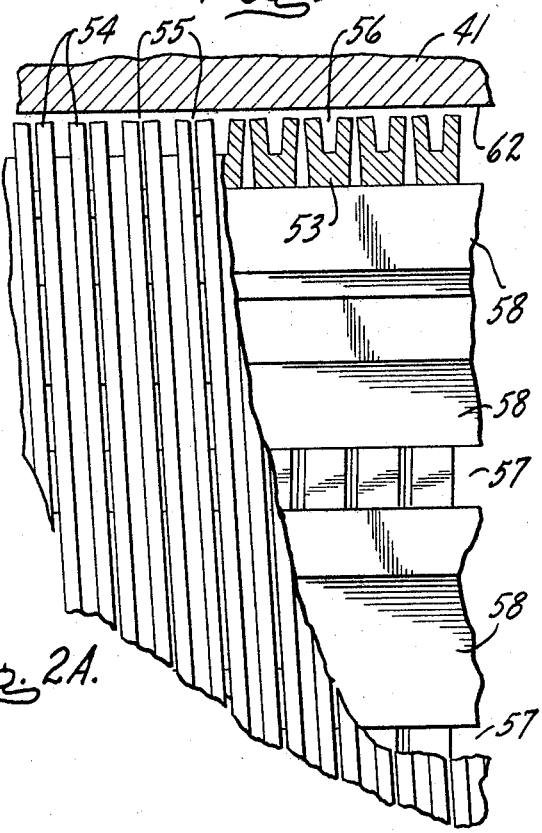

FIG. 9 is an enlarged fragmentary view, partially in plan and partially in horizontal section, detailing the configuration of the outer peripheral portion of the rotor and certain adjacent structure.

Figure 10:
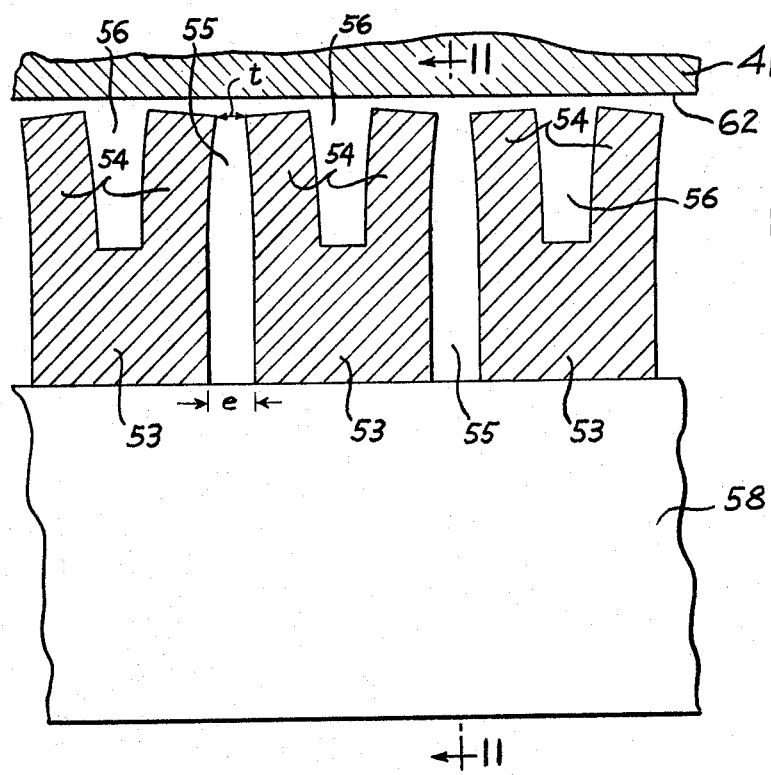

FIG. 10 is a further enlarged fragmentary longitudinal sectional view through a portion of the machine rotor, taken in the plane of the line 10—10 in FIG. 7.

Figure 11:
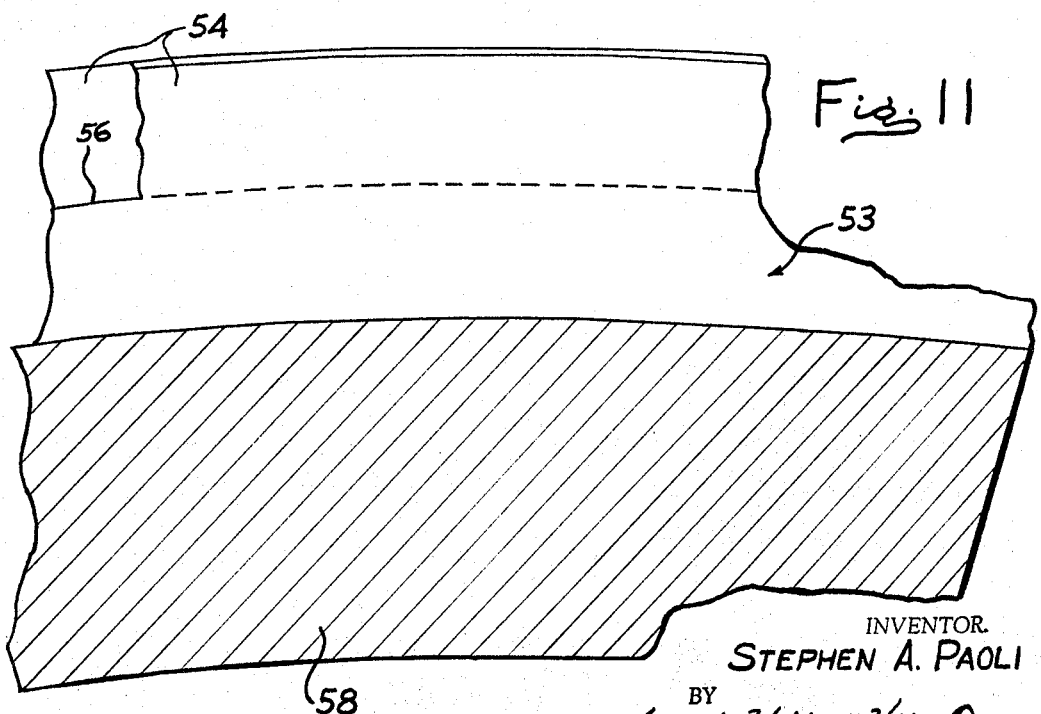

FIG. 11 is an enlarged fragmentary transverse sectional view through a portion of the machine rotor, taken in the plane of the line 11—11 in FIG. 10.

FIG. 12 is a vertical sectional view through still another form of rotor for the machine and taken in the plane of the line 12—12 in FIG. 15.

FIGS. 13 and 14 are enlarged fragmentary longitudinal sectional views taken through the rotor in the plane of the lines 13—13 and 14—14, respectively.

FIG. 15 is a longitudinal sectional view through the form of rotor illustrated in FIGS. 12, 13 and 14.

FIG. 16 is an end view illustrating the left-hand end of the rotor as shown in FIG. 15.

While the invention is susceptible of various modifications and alternatives, certain illustrative embodiments and modes have been shown in the drawings and will be described below in considerable detail. It should be understood, however, that there is no intention to limit the invention to specific forms disclosed, but on the contrary, the intention is to cover all modifications, alternative constructions, modes and equivalents falling within the spirit and scope of the invention as expressed in the appended claims.

Figure 2:
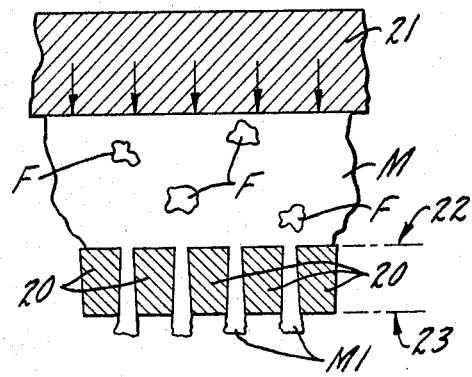
FIGS. 2, 2A and 2B are enlarged diagrammatic sequential views illustrating the practice of the method which constitutes another aspect of the invention.
Figure 2A:
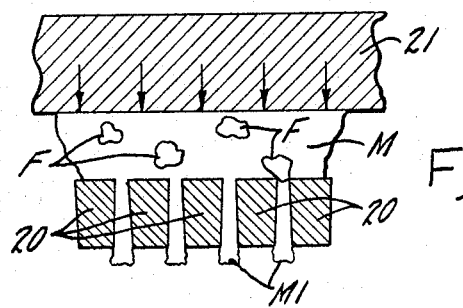
Figure 2B:
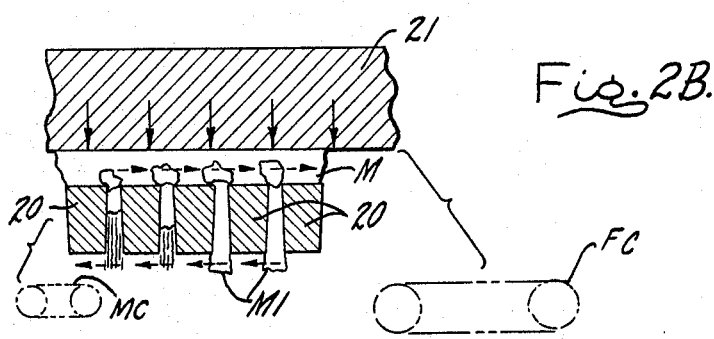

The method aspect of the present invention is diagrammatically illustrated in FIGS. 2, 2A and 2B. These are sequential views illustrating the application of the method to a mass of comminuted meat M having a plurality of entrained fragments F of bone, gristle, sinew or the like. In the practice of method, the entrained fragments are removed and at the same time the meat becomes further comminuted as an incident to such removal. The further comminuted meat and the removed fragments are collected separately.

In order to practice the method of the invention, there are provided a plurality of relatively thin cutting elements 20 in closely spaced apart relation with each other, together with means 21 for pressing the meat M against the cutting elements with sufficient pressure to force it therebetween. The surfaces of the cutting elements facing the pressing means define a common pressure face 22 which may assume a variety of specific contours. By the same token, the surfaces of the cutting elements remote from the pressing means define a common discharge face 23 which may also assume a variety of specific contours. The spaces between the cutting elements are smaller than the average diameter of the smallest fragments to be removed.

The cutting elements and pressing means are movable relative to each other, the meat M being thereby forced between the cutting elements and pressed and cut into much finer pieces than existed previously. The fragments F of zone, gristle or sinew are collected on the pressure face side of the cutting elements. The pressed and cut comminuted meat $M_1$ is collected on the opposite or discharge face side of the cutting elements. As an incident to such relative movement of the cutting elements and pressing means, the collected meat $M_1$ is moved away from the cutting elements 20 and the fragments F are also moved away from the cutting elements. In the present instance, the fragments F are moved in one direction (indicated by the arrows in FIG. 2B) and collected on the conveyor or receiving means FC, while the pressed and cut means $M_1$ is moved in the opposite direction (also indicated by the arrows in FIG. 2B) and collected on the conveyor or receiving means MC.

In the practice of the method of the invention, provision is made to facilitate the flow of fragment-free meat $M_1$ between the cutting elements 20. This is accomplished by so arranging the cutting elements 20 that the respective spaces therebetween will be constricted adjacent the pressure face 22 and progressively relieved toward the discharge face 23. This defines in each space between two neighboring cutting elements a throat $t$ of minimal cross-section adjacent the pressure face 22 and an exit $e$ of somewhat larger cross-section adjacent the discharge face 23. Once the meat $M_1$ has been forced through the throat $t$, it tends to flow readily between the cutting elements and through the exit $e$ without clogging.

Figure 3:
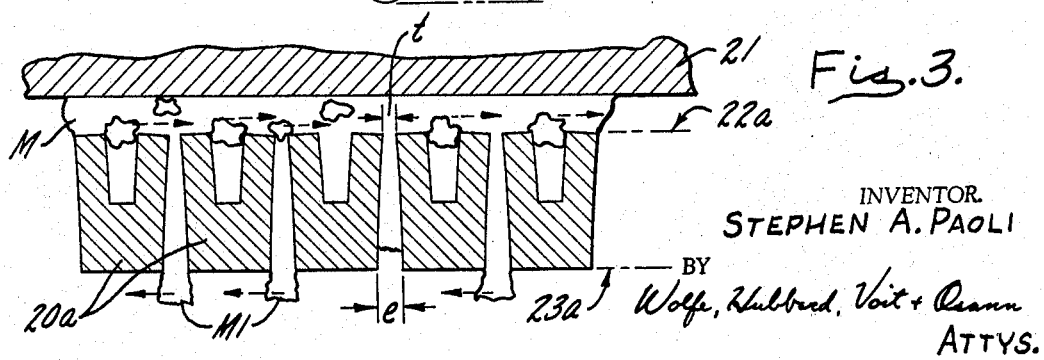
FIG. 3 is an enlarged diagrammatic view illustrating another mode of practicing the method of the invention.

The method of the invention may also be practiced using modified cutting elements 20a as shown in FIG. 3. The elements 20a, like the elements 20, are disposed in closely spaced apart relation with each other and are adapted to coact with the pressing means 21 in the manner described above. Each of the spaces between the elements 20a is constricted to define a throat $t$ adjacent pressure face 22a and is relieved to define a larger exit $e$ adjacent the discharge face 23a. In this instance, however, each cutting element has a blind groove 24 formed in its pressure surface. The groove 24 is somewhat wider than the throat $t$ between adjacent cutting elements and tapers outwardly so as to have its maximum width at the pressure face. By the use of such elements, additional cutting action is brought to bear on the mass of meat M. In addition, the grooves 24 introduce added areas for engaging and ejecting fragments F.

Referring more specifically to FIGURES 1 and 4 to 11, inclusive, the machine aspect of the invention is there exemplified in an illustrative machine 25 adapted to receive ground or comminuted meat containing entrained fragments of bone, bristle or sinew and to separate such fragments from the meat. The machine 25 comprises a base 26 of channel members or other suitable structural elements adapted for mounting on the floor or any other appropriate support. The base 26 has a power unit 28 mounted thereon and which, in turn, supports a separator unit 29 projecting in cantilever fashion therefrom. The separator unit 29 is driven by the power unit 28 under the control of start-stop switch 30.

The separator unit 29 (FIGS. 1, 6, 7 and 8) comprises a casing 31, which in this instance happens to be of generally cylindrical form. The casing 31 has a relatively long intake aperture 32 in its top portion surmounted by a hopper 34 with downwardly converging sides 35, 36 and 37. The casing 31 has a somewhat shorter meat discharge aperture 38 in its lower portion adjacent the power unit 28. After passing through the work zone of the separator unit 29, the usable meat, less fragments, is discharged to a collecting means such as the conveyor MC while the fragments, with a negligible proportion of usable meat, are discharged, via the open outer end of the casing 31, to another collecting means such as the conveyor FC (FIG. 4).

Figure 6:
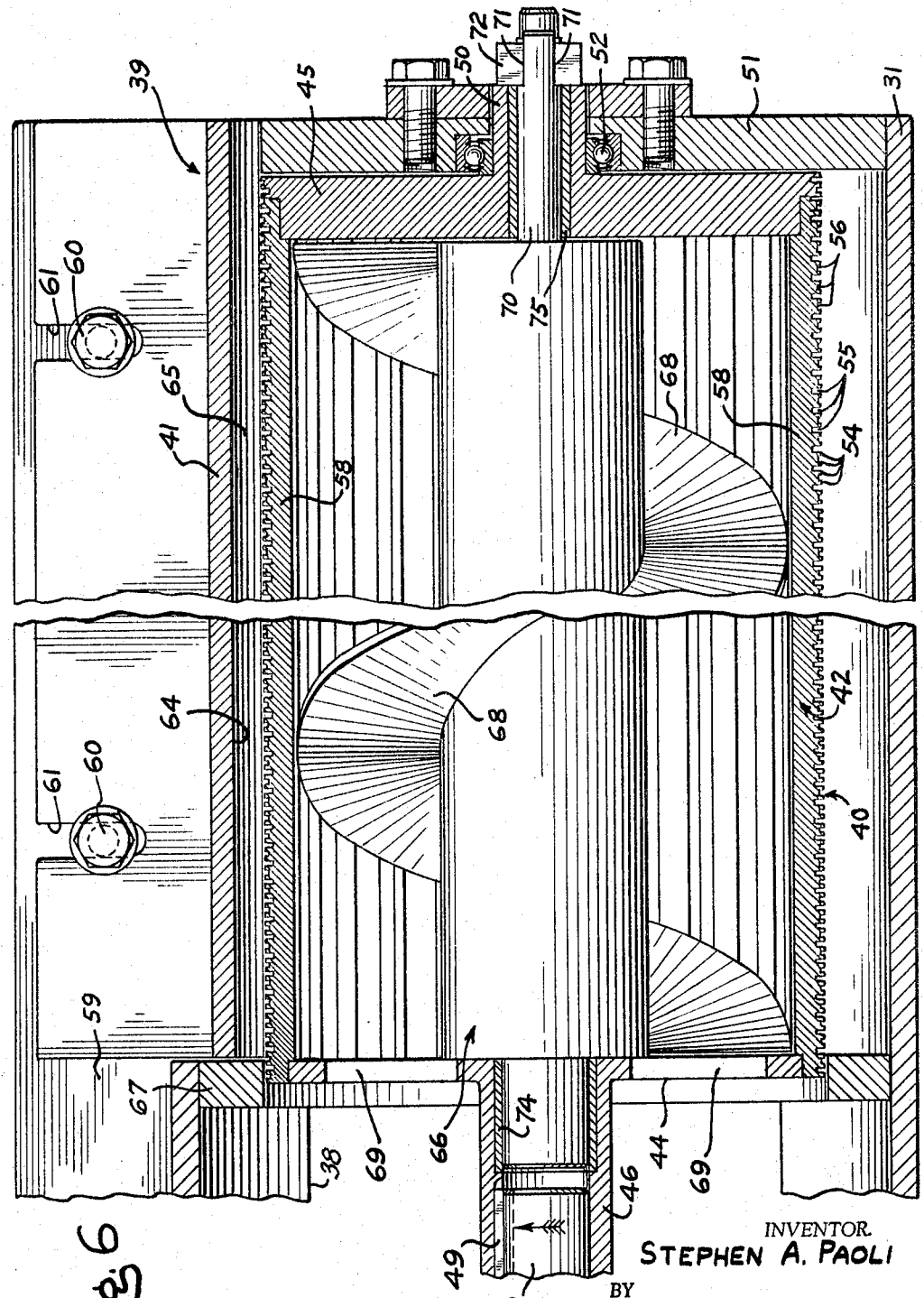
FIG. 6 is an enlarged fragmentary view, partly in plan and partly in section, taken in the plane of the line 6—6 in FIG. 4.

For the purpose of automatically and continuously effecting separation of the bone and other unwanted fragments from the usable comminuted or ground meat without damaging the meat in any way, the separator unit 29 is provided at its work zone with a remarkably simple, yet effective, separator mechanism 39 (FIGS. 6 and 7). Such mechanism comprises a power driven revolvable member 40 having a specially defined outer peripheral surface and a specially defined pressure bar or plate 41 which coacts with the revolvable member to permit the passage of usable meat but not the somewhat harder fragments of bone, gristle or sinew. In the course of its operation, the mechanism 39 is adapted to effect the progressive discharge of usable meat free of such fragments, as well as the progressive discharge of the separated fragments. For sanitation, all of these parts are preferably made of stainless steel or other corrosion resistant material and capable of being quickly disassembled and reassembled.

In the present instance, the member 40 (FIGS. 6, 7 and 8) is formed as a hollow cylindrical rotor with a body 42 supported at its ends by a pair of concentric end plates 44, 45. The plate 44 is rigidly fixed to one end of the body 42 as by welds (not shown) and includes a hub 46. The latter fits telescopically on drive shaft 48 of the power unit 28 and is keyed as at 49 or otherwise drivingly connected to the shaft 48. The end plate 45 is formed with a stepped outer periphery and freely interfits with the opposite or outboard end of the body 42. The plate 45 is also formed with a hub 50 journaled in casing end wall 51 as by means of a combined line and thrust bearing 52.

Provision is made in the separator mechanism 39 for selectively passing pieces of comminuted meat M while holding back and separately discharging fragments F of bone, cartilage, gristle or sinew previously entrained therein. To this end, the rotor is formed with a plurality of relatively thin, closely spaced cutting elements 53 helically disposed in its outer periphery. The spaces between such cutting elements communicate with the interior of the rotor and have a width on the order of 0.008–0.012 inch, which is somewhat smaller than the average diameter of the smallest fragments to be removed. The pressure bar 41 is formed with a cooperating pressure surface tapering progressively closed to the rotor periphery but terminating at a clearance distance therewith also somewhat smaller than the average diameter of the smallest fragments to be removed. Such clearance distance may, for example, be on the order of 0.004–0.005 inch.

Referring more specifically to FIGS. 4 to 11, inclusive, it will be noted that the rotor body 42 comprises cutting elements 53 of generally helical form. In order to intensify the cutting action brought to bear on the meat M and to introduce additional capacity for engaging and ejecting the undesired entrained fragments F, the outer peripheral faces of the cutting elements 53 are in this instance formed with closely spaced twin ribs 54. This defines between each adjacent pair of cutting elements 53 an open or through groove 55 communicating with the interior of the rotor, and a relatively shallow blind groove 56 between the twin ribs 54 of each cutting element. The cutting elements 53 in this case are arranged in multiple helices, each having a pitch of two turns per inch, with six individual elements 53 starting at equal angular intervals about the circumference at one end of the rotor. This results in twenty-four ribs 54 per inch of rotor length on the outer periphery of the rotor body.

Each of the open grooves 55 is constricted adjacent the pressure face defined by the outer peripheral surfaces of the ribs 54 and relieved adjacent the discharge face defined by the inner peripheral surfaces of the cutting elements 53. This creates in each open groove 55 a throat $t$ adjacent the pressure face and an exit $e$ of somewhat larger cross-section adjacent the discharge face, facilitating ready flow of meat through the groove 55. In this instance, the throat $t$ may be 0.008–0.012 inch in width, while the exit $e$ may be 0.016–0.018 inch in width. Each blind groove 56 is substantially wider than the throat of each open groove 55, adapting it more readily to pick up and eject the fragments F. Each blind groove 56 happens to be about 0.050 inch deep and flares outwardly from a minimum width of 0.016–0.018 inch at the bottom to a maximum width of 0.020–0.024 inch at the pressure face, minimizing any tendency to clog.

The interior of the rotor body 42 is formed with a plurality of longitudinally extending slots 57, in this case twenty-four in number, each of a depth extending to the root diameter of the cutting elements 53 and connecting with the open grooves 55, as shown in FIGS. 7, 8, 10 and 11. This defines a corresponding plurality of longitudinally extending lands 58 in the body to preserve its mechanical strength.

Turning now to the pressure bar or plate 41 (FIGS. 5, 6 and 7), it will be noted that the same is a relatively heavy member, preferably of stainless steel or other corrosion resistant material, and in this case of modified L-shaped cross-section. The bar 41 is mounted on platform 59 of the casing 31 and is securely held in a predetermined position as by means of clamping screws 60, being formed with adjusting slots 61 which receive the screws 60 and permit adjustment of the bar 41 toward or away from the outer periphery of the rotor 40. The bar 41 is arranged with its lower left corner edge 62 (as viewed in FIGS. 3 and 5) closest to the peripheral surface of the rotor. The position of the pressure bar 41 circumferentially of the rotor may be varied. For best results, however, the circumferential position of the bar should be such that its edge 62 is in the general vicinity of a horizontal plane through the rotor axis.

Extending upwardly toward the intake aperture 32, and in a direction substantially secantial to the rotor at the edge 62, is an inclined concave face 64 on the bar 41. The face 64 defines with the outer periphery of the rotor a funnel-like pocket 65. Pieces of meat M fed onto the ribbed surface of the rotor are accelerated by the latter and, upon entry into the pocket 65, have somewhat greater frictional engagement with the rotor surface than with the pressure bar face 64. This, along with the angularity or taper of the pressure bar face 64, compresses the meat against the cutting ribs 54 of the rotor, cutting and forcing it therebetween into the interior of the rotor body 42 whence it is directed to a collecting means. This meat, of finely divided pieces, is free of objectionable fragments of bone, gristle or the like and represents a high quality usable product.

The pocket 65 also provides a place at its inner end where the fragments of bone, gristle or sinew accumulate while being gradually driven longitudinally of the rotor and the pressure bar 41. Such longitudinal movement is accomplished by reason of the pitch of the helical ribs on the rotor and its direction is determined by the direction of the pitch of the ribs and the direction of rotation of the rotor. In the illustrative form of the machine described thus far, the ribs have a right-hand pitch and the rotor 40 turns in a clockwise direction, as viewed from the end remote from the motor in FIGS. 1, 5 and 7. This results in moving the bone and gristle fragments F toward the right-handed end of the pressure bar 41, as viewed in FIGS. 1, 6 and 9, discharging them via the open outer end of the pocket 65 onto a receiving means such as the conveyor FC (FIG. 4). Annular baffle 67 (FIG. 6), fixed to the casing 31 adjacent the meat discharge aperture 38, is disposed in closely spaced surrounding relation with the inner or left-hand end of the rotor 40 and prevents bypassing of the pocket 65 by incoming fragment-bearing meat.

The machine may include means to control the rate at which meat is fed into the pocket 65 and to facilitate engagement of the meat with the rotor cutting ribs 54. This may be accomplished by the use of a regulator blade 63 (FIGS. 5 and 7) mounted at or adjacent the trailing side of the intake aperture 32. The blade 63 may be adjustably attached to hopper panel 35 as by means of screws (not shown) so as to permit the blade to be shifted toward or from the rotor and selectively positioned for most favorable operation.

Figure 1:
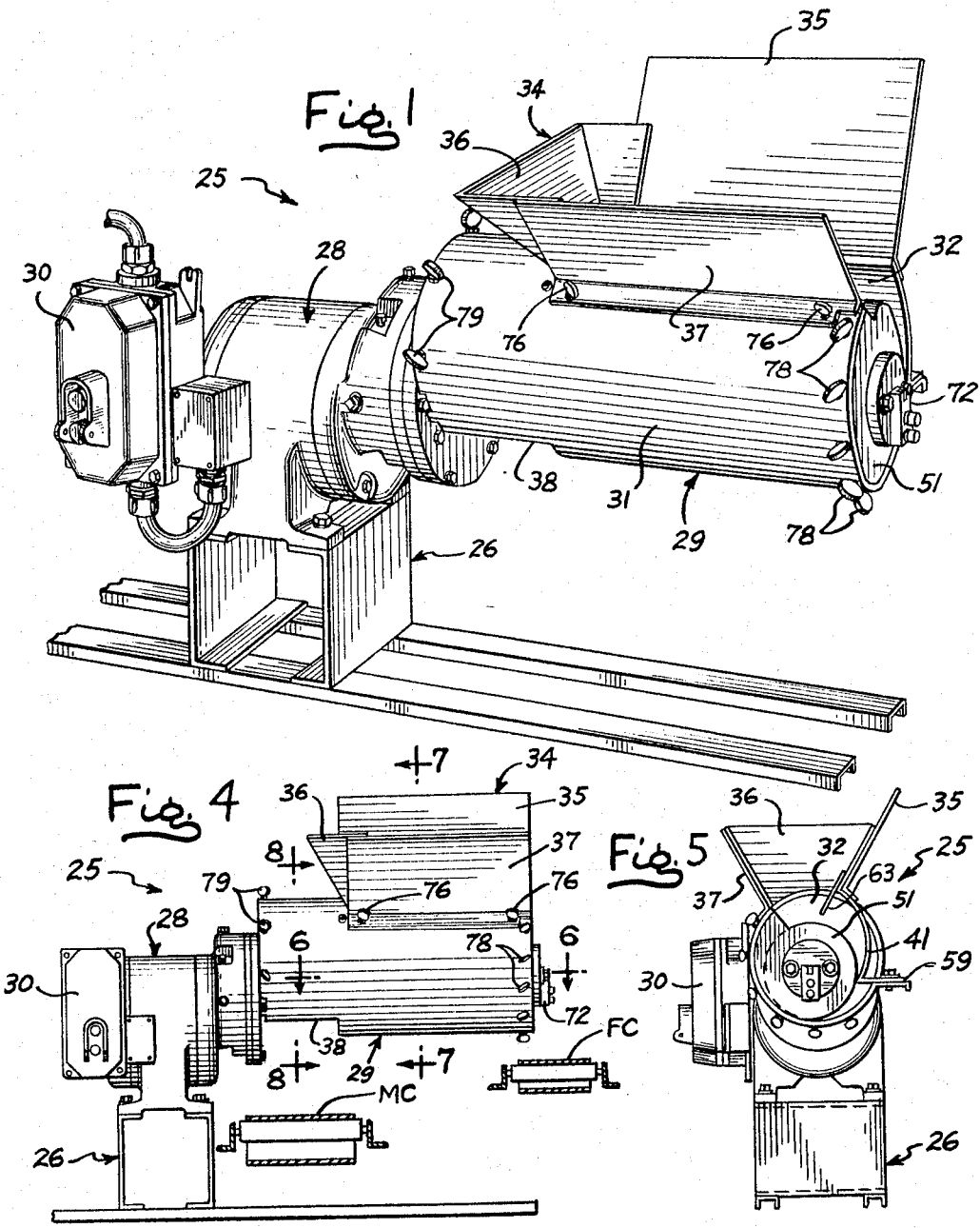
FIGURE 1 is a perspective view of an illustrative bone fragment separating machine exemplifying the present invention.

Provision is made for collecting and discharging the fragment-free usable meat product from the interior of the rotor body continuously and as an incident to rotation of the rotor. This is accomplished in the present instance by the use of an auger 66 (FIGS. 6 and 7) having a helical flight 68 fitted in relatively closely spaced relation with the inner faces of the lands 58. The auger is housed within the interior of the rotor body 42 and secured against rotation. Thus, as the rotor 40 rotates, relative movement will occur between the inner wall of the rotor body 42 and the auger flight 68 tending to scrape the meat from the inside of the rotor body and move it in a helical path following the flight 68. As will be appreciated, the helical direction of the flight 68 determines which way the product will be moved, and, in this instance, it is adapted to direct the product to the left as viewed in FIGS. 1 and 6. To facilitate discharge of the product from the auger, the end plate 44 has a plurality of large sector shaped apertures 69 (FIG. 8). The product passes through these apertures, out of the rotor body 42, and thence out the meat discharge aperture 38 in the machine casing (FIGS. 1, 4 and 8). From the aperture 38, the meat drops to an appropriate receiving means such as the discharge conveyor 24.

The auger 66 is held in place by means of auger shaft 70 to which it is rigidly fixed. The right-hand end portion of the shaft 70 (as viewed in FIG. 6) is formed with a pair of opposed flats 71 and slidably fits into an opening of corresponding shape in a fixed bracket 72. The opposite end of the shaft 70, of larger diameter, simply telescopes into the hub 46 of inner end plate 44. Bearings 74 and 75, recessed into respective ones of the end supports 44, 45, journal the rotor 40 with respect to the auger 66 and auger shaft 70.

The machine 25 is designed so that its working parts in active contact with the meat may be readily dismantled for cleaning. It will, accordingly, be noted that one or more of the hopper panels 37 may be removed by loosening detachable fasteners such as thumb screws 76 (FIGS. 1, 4 and 5). Outer end wall 51 of the casing may be removed by loosening additional detachable fasteners such as thumb screws 78. This provides access to the rotor 40 and auger 66, permitting these members to be removed bodily by sliding them outwardly so as to disengage the hub 46 from the drive shaft 48. The casing 31 itself may then be disconnected from the power unit 28 by loosening still other fasteners such as thumb screws 79.

For optimum application of the machine to the widely varying operating conditions found in the poultry, meat, and food processing industry, a number of factors must be considered and correlated. These may be grouped broadly under two categories, the physical characteristics of the machine and the composition of the mass of comminuted meat and fragments of bone, gristle or sinew to be processed by the machine. Under physical characteristics, factors such as rotor length and diameter, rotor speed, drive power, configuration and spacing of the cutting element ribs, and pressure bar placement, both circumferential and radial, all have a bearing on the capacity of the machine in pounds of material processed per hour. These same factors also affect the efficiency of the machine in terms of percentage ratio of pounds of usable meat obtained to total pounds of material processed. With regard to the second category, it will be appreciated that a mass of comminuted meat with a high ratio of fragment content to usable meat will require different processing time from a mass with a lower ratio of fragments to usable meat. The relative hardness of the muscular structure, the fat content, and the moisture content of the meat are further factors which affect the processing time.

Eminently satisfactory results on all varieties of poultry and meat products have been obtained with two machines of different size and capacity having the following characteristics:

|  | Machine No. 1 | Machine No. 2 |
|---|---|---|
| Rotor outside diameter, in | 6.500 | 12.500 |
| Rotor inside diameter, in | 6.050 | 12.050 |
| Rotor length, in | 12 | 18 |
| Pitch of helical cutting elements (turns per inch) | 2 | 1 |
| Number of helical cutting elements per inch on rotor | 12 | 12 |
| Number of cutting ribs per inch on rotor | 24 | 24 |
| Width of cutting rib, in | 0.020-0.024 | 0.020-0.024 |
| Number of through grooves per inch on rotor | 12 | 12 |
| Width of through groove at throat, in | 0.008-0.012 | 0.008-0.012 |
| Width of through groove at exit, in | 0.016-0.018 | 0.016-0.018 |
| Depth of through groove, in | 0.100 | 0.100 |
| Number of blind grooves per inch on rotor | 12 | 12 |
| Width of blind groove at pressure face, in | 0.020-0.024 | 0.020-0.024 |
| Width of blind groove at bottom, in | 0.016-0.018 | 0.016-0.018 |
| Depth of blind groove, in | 0.050 | 0.050 |
| Number of longitudinal lands in rotor | 24 | 48 |
| Pressure bar clearance, in | 0.004-0.005 | 0.004-0.005 |
| Rotor speed, r.p.m | 287 | 155 |
| Horsepower of drive motor | 1 | 3 |
| Outer casing diameter, in | 8 | 14 |
| Outer casing length, in | 18 | 25 |
| Capacity in pounds of raw material (comminuted meat and fragments), input per hour | 150 | 650 |
| Capacity in pounds of fragment-free meat output per hour (based on recovery factor of approximately 40%) | 60 | 250 |

Referring next to FIGS. 12 to 15, inclusive, there is shown a further modified form of rotor 91 also adapted for operation in the machine 25. This form of the device finds particular utility where relatively fine pieces of meat are fed to the machine and where it is desired to take advantage of the action of the machine to comminute the meat into still finer pieces or into a consistency approaching that of an emulsified mass.

The rotor 91 comprises a body 92 having a plurality of helical ribs 94 and alternate grooves 95 in its outer peripheral surface. In the present instance, the rotor is approximately 6 inches in diameter and each rib happens to have a height of 0.060 inch, a width of 0.045 inch and a pitch of 2. The ribs are arranged in multiple, with nine individual ribs starting at equal angular intervals, thus defining 18 ribs per inch of rotor length with each spacing groove 95 between ribs approximately 0.010 inch in width at the top and 0.014 at the bottom. The interior of the body 92 is formed with a plurality of longitudinally extending slots 96, in this case thirty in number, each of a depth extending to the root diameter of the ribs and connecting with the grooves 95, as shown in FIGS. 10 and 12. This defines a corresponding plurality of longitudinally extending lands 98 in the body to preserve its mechanical strength.

The rotor 91 is provided with end supports 99, 100 which thread into the end portions of the rotor body. Power to turn the rotor is applied from hollow drive shaft 101 keyed as at 102 to the end support 100. The shaft 101, supporting one end of the rotor, is journaled in bearing 104 which is mounted in depending relation from a bracket 105. The opposite end of the rotor is supported from a suitable bracket 106.

Provision is made for collecting and discharging the fragment-free meat from the interior of the rotor body continuously, and as an incident to rotation of the rotor, by the use of an auger 108. The latter has a helical flight 109 fitted in relatively closely spaced relation with the inner faces of the lands 98. The auger is housed within the interior of the rotor body 92 and secured against rotation. Thus, as the rotor 91 rotates, relative movement will occur between the inner wall of the rotor body 92 and the auger flight 109 tending to scrape the meat from the inside of the rotor body and move it in a helical path following the flight 109. As will be appreciated, the helical direction of the flight 109 determines which way the product will be moved, and, in this instance, it is adapted to direct the product to the left as viewed in FIG. 15. To facilitate discharge of the product from the auger, the end support 100 is of spiderlike form and has a plurality of large sector shaped apertures 110. The product passes through these apertures and out of the rotor body 92 to the discharge conveyor MC.

The auger 108 is held in place by means of auger shaft 111 to which it is rigidly fixed. The right-hand end portion 112 of the shaft 111 (as viewed in FIG. 15) is formed with a square cross-section and slidably fits into an opening of corresponding shape in the depending bracket 105. The opposite end of the shaft 111 simply telescopes into the bore of hollow drive shaft 101. Bearings 114 and 115, recessed into respective ones of the end supports 99, 100, journal the rotor 91 with respect to the auger 108 and auger shaft 111.

It will be appreciated that the invention described herein may be utilized to great advantage, particularly in the poultry processing industry. Automated boning of a whole fowl, such as a cock or fryer hen, never accomplished heretofore, may now be carried out with speed and efficiency through application of the present invention. The whole fowl, after dressing, is simply run through a grinder and the resulting mass of comminuted meat and fragments of bone, gristle and the like is then fed into a machine such as the machine 25. The latter will separate the usable meat from the unwanted fragments, with a high quality usable meat yield of about 60% by weight. Turkey wings and drumsticks, heretofore difficult if not impossible to bone satisfactorily, may be ground and passed through machines embodying the invention, emerging as high quality usable meat having several times its previous value. Necks, backs, and other parts of chicken and turkey never before boned economically, may now be similarly boned and converted to higher value usable meat in a fully automated process. These results are of real economic significance to the poultry industry.

I claim as my invention:

1. A machine for separating fragments of bone, gristle or the like from comminuted meat and comprising, in combination a casing, a revolvable member journaled on said casing, means for revolving said member, a helical rib on the outer peripheral surface of said member, a pressure bar disposed longitudinally of said member, an edge on said pressure bar disposed in relatively closely spaced relation with said outer peripheral surface of said member and said rib so as to preclude the passage of such fragments therebetween, means defining a sloping face on said pressure bar extending from said member at said edge and diverging therefrom in a direction opposite to the direction of movement of said member, means defining in front of said pressure bar an exposed portion of said outer peripheral surface of said member including said rib, and means for directing comminuted meat toward said exposed portion.

2. A machine for separating fragments of material such as bone or gristle from comminuted meat and comprising, in combination, a casing, a revolvable member journaled in said casing and having a helically ribbed peripheral surface, means for revolving said member, a pressure bar disposed longitudinally of said member and relatively closely spaced therefrom so as to preclude the passage of such fragments therebetween, said pressure bar and said peripheral surface of said member defining a funnel-like pocket of decreasing cross section in the direction of movement of said member, means defining an exposed portion of said helically ribbed peripheral surface in front of said pressure bar, means for directing comminuted meat toward said exposed portion, and means for adjustably regulating the flow of comminuted meat into said pocket.

3. In a machine for separating fragments of material such as bone or gristle from comminuted meat, the combination comprising a revolvable member having a peripheral surface, a fixed pressure bar disposed longitudinally of said member, an edge on said bar disposed in relatively closely spaced relation with said peripheral surface of said member, a helical rib disposed in relatively closely spaced convolutions in said peripheral surface of said member, the space between adjacent convolutions of said helical rib and the space between said pressure bar edge and said peripheral surface being less than the average diameter of the smallest fragments to be separated and the space between adjacent convolutions of said helical rib communicating with the interior of said member.

4. In a machine for separating fragments of material such as bone or gristle from comminuted meat, the combination comprising a hollow perforate revolvable member, a fixed pressure bar disposed longitudinally of said member, an edge on said bar disposed in relatively closely spaced relation with said peripheral surface of said member, means defining a tapering face on said bar extending substantially secantially from said member at said edge and in a direction opposite to the direction of movement of said member, a plurality of relatively closely spaced helical ribs in said outer peripheral surface of said member, the space between said ribs and the space between said pressure bar edge and said peripheral surface being less than the mean diameter of the smallest of said fragments to be separated, means for directing comminuted meat to said member and said pressure bar, and means for revolving said member relative to said pressure bar whereby comminuted meat is forced between said ribs into said member and said fragments are arrested and discharged on the outer periphery of said member.

5. A machine for separating fragments of bone or gristle from comminuted meat and comprising, in combination, a support, a hollow cylindrical rotor journaled on said support, means for rotating said rotor, at least one helical rib on the outer peripheral surface of said rotor defining a plurality of helical grooves therein, means defining longitudinal slots in the inner peripheral wall of said rotor extending to the bottom of said rib and communicating with said grooves, a pressure bar disposed longitudinally of said rotor and relatively closely spaced therefrom so as to preclude the passage of such fragments therebetween, means for directing comminuted meat to said rotor and said pressure bar, and means for discharging meat from the interior of said rotor.

6. In a machine for removing entrained bone, gristle and like fragments from comminuted meat, the combination comprising a support, a hollow cylindrical rotor journaled on said support, at least one helical rib in the outer peripheral surface of said rotor defining a plurality of helical grooves therein, each said groove being of a size adapted to preclude passage of said fragments therethrough but adapted to permit the passage of comminuted meat therethrough, means defining a plurality of longitudinal slots in the inner peripheral wall of said rotor extending to the root diameter of said rib and communicating with said grooves, a pressure bar disposed longitudinally of said rotor, an edge on said pressure bar disposed in relatively closely spaced relation with said outer peripheral surface of said rotor and said rib so as to preclude the passage of such fragments therebetween, means for directing commuinuted meat between said rotor and said pressure bar, an auger housed within said rotor and mounted for relative movement with respect to said inner peripheral wall thereof to scrape comminuted meat therefrom, and means for discharging such meat from said auger to the exterior of said rotor.

7. In a machine for removing entrained bone, gristle and like fragments from comminuted meat, the combination comprising a support casing, a hollow cylindrical rotor body, a rotor drive shaft journaled in said casing, an end fixed to said rotor shaft and connected to said body, at least one helical rib in the outer peripheral surface of said rotor body defining a plurality of constricted helical grooves therein, means defining a plurality of longitudinal slots in the inner peripheral wall of said rotor body extending to the root diameter of said rib and communicating with said grooves, a pressure bar disposed longitudinally of said rotor body, an edge on said pressure bar disposed in relatively closely spaced relation with said outer peripheral surface of said rotor body and said rib so as to preclude the passage of said fragments therebetween, means for directing comminuted meat between said rotor body and pressure bar, an auger fixedly housed within said rotor body and adapted to scrape refined comminuted meat from said inner peripheral wall, an auger shaft fixed to said auger and having one end journaled in said one end support, and another end support connected to said rotor body and journaled on the opposite end of said auger shaft, said other end support having openings therein for discharging such meat from said auger to the exterior of said rotor.

8. A machine for removing fragments of hard tissue material such as bone or cartilage from comminuted meat and having in combination, a support, a revolvable member mounted on said support, said member being perforated by at least one constricted helical groove communicating with its interior, said groove being narrower adjacent the outer periphery of said member than the interior and of a size adapting it to pass comminuted meat but not said fragments, means for directing comminuted meat into contact with the outer surface of said member, means for forcing the meat through said helical groove and into said member as the latter is revolved, and means for revolving said member.

9. A machine for removing bone, cartilage and like fragments from ground meat and having, in combination, a machine casing, a hollow cylinder rotatably mounted in said casing, a plurality of helical cutting elements defining corresponding helical grooves perforating said cylinder, each of said grooves being constricted in width adjacent the outer periphery and of greater width adjacent the inner periphery of said cylinder and adapted to pass ground meat but not said fragments, an elongated bar adjacent and parallel to said cylinder, said bar being adapted to force meat through said helical grooves and into said cylinder as the latter is rotated, and means for rotating said cylinder.

10. A machine for separating fragments of bone, gristle or the like from comminuted meat and comprising the combination of a revolvable member, a plurality of cutting elements fixed to said member in closely spaced apart relation with each other, the spaces between said cutting elements being constricted in width adjacent one side thereof and relieved to have greater width adjacent the other side thereof so as to pass comminuted meat but not said fragments, means for pressing comminuted meat against said one side of said cutting elements with sufficient pressure to force it therebetween, means for moving said fragments away from said one side of said cutting elements, and means for moving said pressed and cut comminuted meat away from said other side of cutting elements.

11. A machine for removing bone, gristle and like fragments from ground meat and comprising, in combination, a machine casing, a hollow revolvable member mounted in said casing, a plurality of helical cutting elements defining a first series of helical grooves through said member and a second series of blind grooves in the outer periphery of said member, each of said through grooves being constricted adjacent said outer periphery of said member and adapted to pass ground meat but not said fragments, each of said blind grooves flaring outwardly to a maximum width at said outer periphery of said member, an elongated bar adjacent and parallel to said member, said bar being adapted to force meat into said helical grooves and into said member as the latter is revolved, and means for revolving said member.

12. A machine for removing fragments of bone, gristle and the like from ground meat and having, in combination, an outer casing, a hollow cylinder rotatably mounted in said casing, a plurality of helical cutting elements defining a first series of helical grooves through said cylinder, and an alternate series of blind grooves in the outer periphery thereof, each of said through grooves being constricted adjacent the outer periphery of said cylinder and adapted to pass ground meat but not said fragments, each of said blind grooves flaring outwardly to a maximum width at said outer periphery of said cylinder, an elongated bar disposed longitudinally adjacent said cylinder, said bar being spaced from said outer periphery of said cylinder by an amount not exceeding the width of said grooves, said bar being adapted to force meat without fragments into said cylinder via said through grooves as the cylinder is rotated, and means for rotating said cylinder.

References Cited by the Examiner

UNITED STATES PATENTS

| | | | |
|---|---|---|---|
| 833,715 | 10/1906 | Graham | 209—91 |
| 1,151,674 | 8/1915 | Durrant | 146—240 |
| 1,244,774 | 10/1917 | Pointe | 146—174 X |
| 1,446,091 | 2/1923 | Hurt | 146—176 |
| 1,480,984 | 1/1924 | Bell | 146—222 |
| 1,752,047 | 3/1930 | Wirt | 146—176 |
| 3,024,823 | 3/1962 | Hyde et al. | 146—174 |

FOREIGN PATENTS 61,721   12/1943   Denmark.

ROBERT C. RIORDON, *Primary Examiner.*

J. SPENCER OVERHOLSER, WILLIE G. ABERCROMBIE, *Examiners.*